US011027920B2

(12) United States Patent
Yoshimoto et al.

(10) Patent No.: US 11,027,920 B2
(45) Date of Patent: Jun. 8, 2021

(54) RACK MANAGEMENT SYSTEM AND RACK MANAGEMENT METHOD

(71) Applicant: HITACHI TRANSPORT SYSTEM, LTD., Tokyo (JP)

(72) Inventors: Hiroyuki Yoshimoto, Tokyo (JP); Yoriko Kazama, Tokyo (JP); Junichi Kimura, Tokyo (JP); Ryota Kamoshida, Tokyo (JP); Emi Takahashi, Tokyo (JP); Haruka Terai, Tokyo (JP)

(73) Assignee: HITACHI TRANSPORT SYSTEM, LTD., Tokyo (JP)

( * ) Notice: Subject to any disclaimer, the term of this patent is extended or adjusted under 35 U.S.C. 154(b) by 214 days.

(21) Appl. No.: 16/171,434

(22) Filed: Oct. 26, 2018

(65) Prior Publication Data
US 2019/0127146 A1   May 2, 2019

(30) Foreign Application Priority Data
Oct. 26, 2017   (JP) .............................. JP2017-207306

(51) Int. Cl.
*G06Q 10/08* (2012.01)
*B65G 1/137* (2006.01)
*G06Q 50/28* (2012.01)

(52) U.S. Cl.
CPC ......... B65G 1/1373 (2013.01); G06Q 10/087 (2013.01); G06Q 50/28 (2013.01)

(58) Field of Classification Search
CPC .... G06Q 10/087; G06Q 10/043; G06Q 50/28; G06Q 10/08; B65G 1/1373
See application file for complete search history.

(56) References Cited

U.S. PATENT DOCUMENTS

| 8,965,562 | B1* | 2/2015 | Wurman | G06Q 10/087 700/216 |
|---|---|---|---|---|
| 9,067,317 | B1 | 6/2015 | Wurman et al. | |
| 9,378,482 | B1* | 6/2016 | Pikler | G06Q 10/087 |
| 2008/0001372 | A1* | 1/2008 | Hoffman | G05D 1/0297 280/35 |
| 2016/0129592 | A1* | 5/2016 | Saboo | G05D 1/0297 700/248 |
| 2016/0246301 | A1 | 8/2016 | Kazama et al. | |
| 2018/0060764 | A1* | 3/2018 | Hance | G06Q 10/087 |

FOREIGN PATENT DOCUMENTS

WO   2015/052830 A1   4/2015

* cited by examiner

*Primary Examiner* — Timothy R Waggoner
(74) *Attorney, Agent, or Firm* — Volpe Koenig

(57) ABSTRACT

Provided is a rack management system, including a processor and a storage unit. The storage unit stores information indicating positions of sections included in an area in which storage racks that store articles can be arranged. One of the storage racks can be arranged in each of the sections. At least one of the sections is surrounded by other adjacent sections without an aisle to convey the storage racks therebetween. The processor classifies the sections into sections assigned ranks indicating a degree of efficiency of an operation to convey the storage racks placed therein to a predetermined working area, and one or more empty sections into which, if there is a need to move one or more other storage racks in order to convey a storage rack placed in a given section, the other storage racks that were moved are placed, and outputs results of the classification.

13 Claims, 14 Drawing Sheets

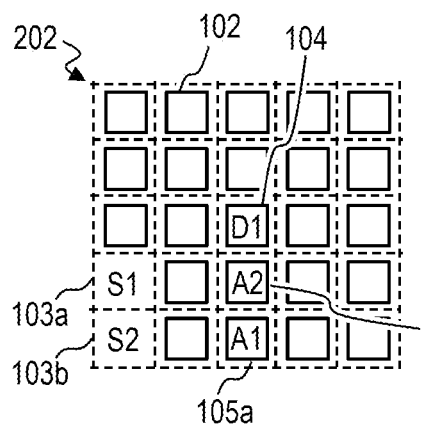
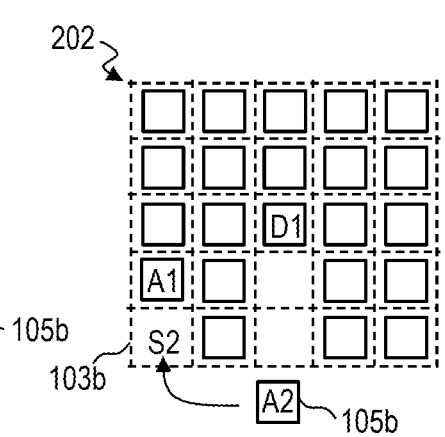
FIG.14A
FIG.14C
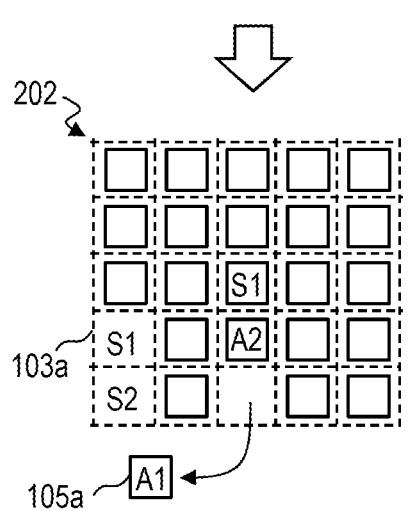
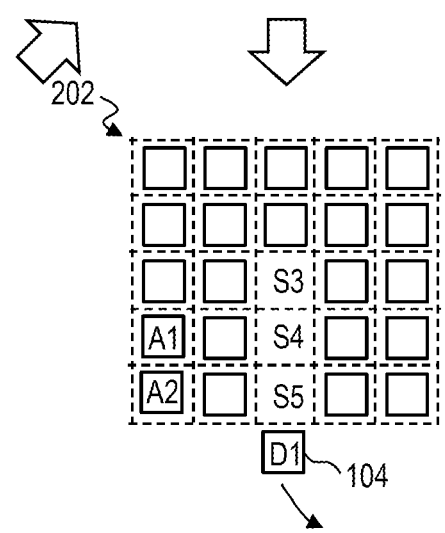
FIG.14B
FIG.14D

RACK MANAGEMENT SYSTEM AND RACK MANAGEMENT METHOD

CLAIM OF PRIORITY

The present application claims priority from Japanese patent application JP2017-207306 filed on Oct. 26, 2017, the content of which is hereby incorporated by reference into this application.

BACKGROUND OF THE INVENTION

The present invention relates to management of racks that store articles in a warehouse or the like.

In warehouses or factories, operations are performed in which articles are picked from a storage rack as necessary in the order in which the articles were managed, and after articles of a designated group are gathered and stored in packing boxes, the articles are delivered. As a method for efficiently performing a picking operation for a large amount of stored articles, in recent years, operation systems have garnered attention in which racks in which articles to be shipped are stored are conveyed by an automatic conveyance vehicle to a work area (hereinafter referred to as a work station) where picking workers are present. In many of the systems in which storage racks are conveyed by such an automatic conveyance vehicle, typically all storage racks are stored facing an aisle in order to improve conveyance efficiency of the racks by the automatic conveyance vehicles. However, some systems are considered in which racks are tightly packed such that there are some racks included in which none of the four sides thereof faces an aisle, in order to improve storage efficiency of articles.

U.S. Pat. No. 9,067,317 Specification (Patent Document 1) discloses a technique in which, when conveying a first rack that does not face an aisle from a storage area, a second rack that is located between the first rack and an aisle is temporarily carried into the aisle to secure a passage for the first rack, and then the first rack is carried into the aisle. Additionally, WO 2015/052830 (Patent Document 2) discloses a technique in which, when conveying a first rack that is surrounded by other racks, a second rack that is located between the first rack and an aisle is temporarily moved into a buffer area designated in advance that is a location away from the storage area in order to secure a passage for the first rack, the first rack is carried outside the storage area, and lastly, the second rack, which was temporarily moved into the buffer area, is returned to its original position.

SUMMARY OF THE INVENTION

Here, an example of refuge spaces for storage racks that are arranged in a tightly packed manner will be explained with reference to FIGS. 14A to 14D.

FIGS. 14A to 14D are descriptive views of a method for securing refuge spaces where no storage racks are disposed, within an area where storage racks (also referred to simply as "racks") are arranged in a tightly packed manner.

Specifically, FIGS. 14A to 14D are plan views of a storage area 202 (rack arrangement area) in which 23 storage racks are arranged in a tightly packed manner. This storage area 202 includes 25 sections indicated with broken lines. One storage rack can be disposed in each section. In FIGS. 14A to 14D, each solid line quadrilateral represents a storage rack (storage rack 102, for example). When moving a storage rack D1 (storage rack 104) in the center of FIG. 14A, an automatic conveyance vehicle (not shown) first temporarily moves the rack A1 (storage rack 105a) that is in the way from the storage area, and then, moves the rack to a refuge space S1 (section 103a) in the storage area (FIGS. 14B, 14C). Next, the automatic conveyance vehicle similarly moves a rack A2 (storage rack 105b) that is also in the way to the refuge space S2 (section 103b) (FIG. 14C, 14D). Then, the automatic conveyance vehicle moves the storage rack D1 and uses the three newly opened up spaces S3, S4, and S5 as new refuge spaces (FIG. 14D).

Below, the group of racks arranged in a tightly packed manner so as to include at least one rack in which none of the four sides thereof faces an aisle, such as shown in FIGS. 14A to 14D, is referred to as a high density rack arrangement area. Also, racks that are located in the high density rack arrangement area are referred to as high density-arranged racks.

Movement of a rack from the high density rack arrangement area involves movement of other racks out of the way, and thus, more time is taken to move such a rack to a location where the picking operation is performed, compared to movement from a location where at least one of four sides of the rack faces the aisle, and thus, the overall efficiency of the operation is reduced. In particular, in the case of movement from the center of the high density rack arrangement area such as shown in FIGS. 14A to 14D, there are many movements to move racks out of the way, and thus, the work efficiency is greatly reduced. The present invention was made in view of such a problem.

In order to solve at least one of the foregoing problems, a representative example of the present invention provides a rack management system, comprising: a processor; and a storage unit coupled to the processor, wherein the storage unit stores information indicating positions of a plurality of sections included in an area in which storage racks that store articles can be arranged, wherein one of said storage racks can be arranged in each of the plurality of sections, wherein at least one of the plurality of sections is surrounded by other adjacent said sections without an aisle to convey the storage racks therebetween, and wherein the processor classifies the plurality of sections into a plurality of sections assigned ranks indicating a degree of efficiency of an operation to convey the storage racks placed therein to a predetermined working area, and one or more empty sections into which, if there is a need to move one or more other storage racks in order to convey a storage rack placed in a given section, the other storage racks that were moved are placed, and outputs results of the classification.

According to one aspect of the present invention, it is possible to improve the storage efficiency of racks while mitigating a reduction in delivery operation efficiency of racks in the warehouse overall. Problems, configurations, and effects other than what was described above are made clear by the description of embodiments below.

BRIEF DESCRIPTION OF THE DRAWINGS

FIGS. 14A to 14D are descriptive views of a method for securing refuge spaces where no storage racks are disposed, within an area where storage racks are arranged in a tightly packed manner.

DETAILED DESCRIPTION OF EMBODIMENTS

Embodiments of the present invention will be explained below in detail with reference to the drawings. However, in the embodiments described below, while usage examples of rack conveyance in the warehouse by conveyance vehicles will be described, application of the present invention is not necessarily limited to warehouses using conveyance vehicles.

Embodiment 1

Embodiment 1 of the present invention will be described.

Figure 1:
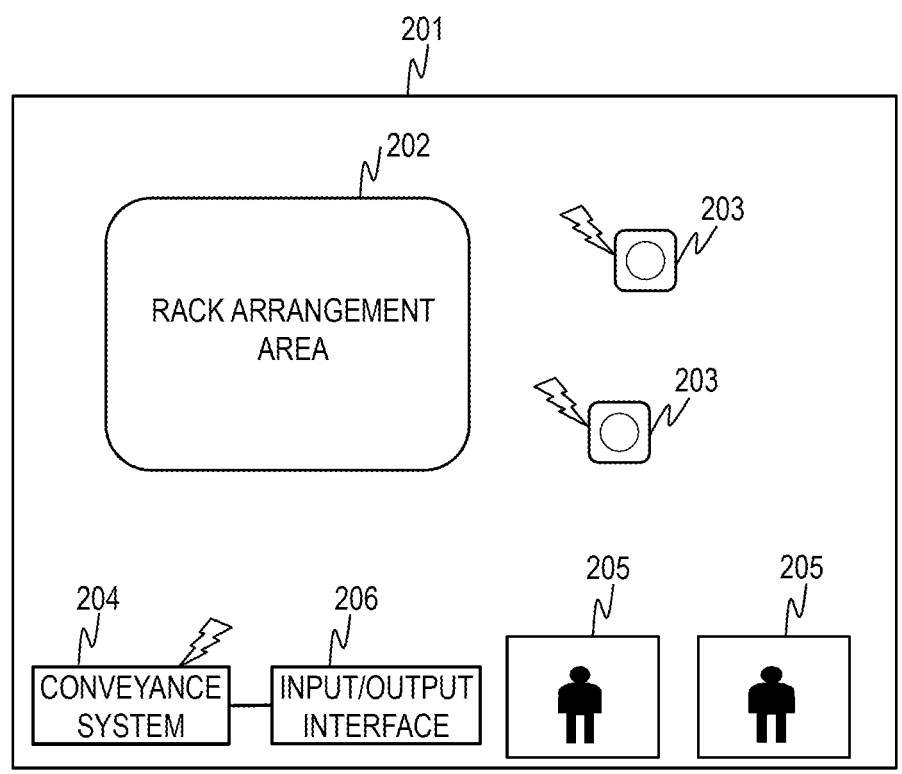
FIG. 1 is a schematic descriptive view of a warehouse having a high density rack arrangement area according to Embodiment 1 of the present invention.

FIG. 1 is a schematic descriptive view of a warehouse having a high density rack arrangement area according to Embodiment 1 of the present invention.

A warehouse 201 has a rack arrangement area 202 where a plurality of storage racks that store articles (also referred to below simply as "racks") are arranged. The rack arrangement area 202 includes a high density rack arrangement area. A conveyance vehicle 203 conveys racks from the rack arrangement area 202 to a work station 205. The conveyance vehicle 203 is an automatic conveyance vehicle that conveys racks according to instructions from a conveyance system 204 to be described later. There may be a plurality of conveyance vehicles 203 in the warehouse 201. Here, all of the plurality of conveyance vehicles are indicated as the conveyance vehicles 203, but when it is necessary to differentiate individual conveyance vehicles, the conveyance vehicles are indicated as conveyance vehicles 203a, 203b, etc.

At the work station 205, a worker removes articles from a conveyed rack or stores articles in a rack. There may be a plurality of work stations 205 in the warehouse 201. Here, all of the plurality of work stations are indicated as the work stations 205, but when it is necessary to differentiate individual work stations, the work stations are indicated as work stations 205a, 205b, etc.

After work is completed at the work station 205, the conveyance vehicle 203 returns the rack to the rack arrangement area 202 and moves onto the next task or stands by until it receives a new instruction. The conveyance instructions for the rack to the conveyance vehicle 203 are issued by the conveyance system 204. In the present embodiment, the conveyance system 204 receives instructions from an input/output interface 206 and performs tasks to reflect the instructions. In FIG. 1, the input/output interface 206 is disposed outside of the conveyance system 204, but in reality, the input/output interface 206 may be included in the conveyance system 204 as will be described later.

Figure 2:
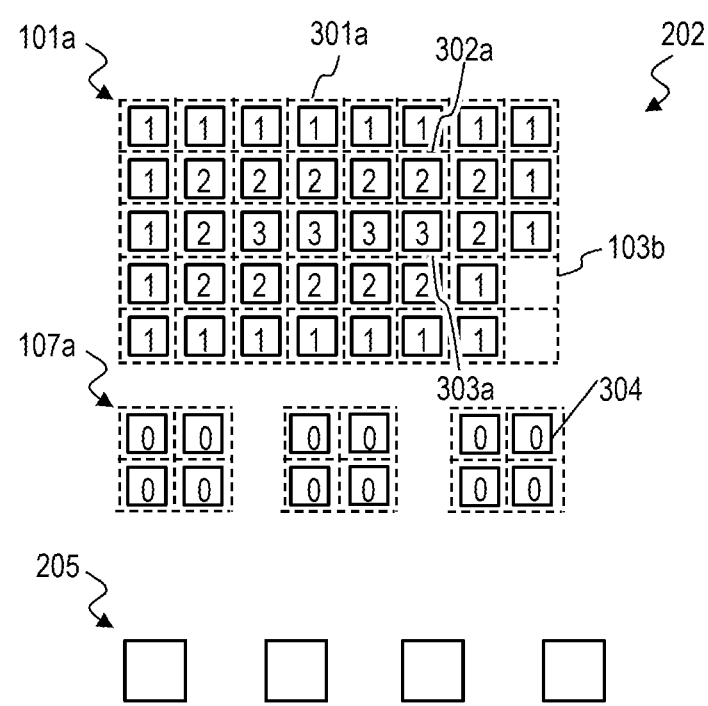
FIG. 2 is a descriptive view of an example of an arrangement of racks in the rack arrangement area according to Embodiment 1 of the present invention.

FIG. 2 is a descriptive view of an example of an arrangement of racks in the rack arrangement area 202 according to Embodiment 1 of the present invention.

Specifically, FIG. 2 is a plan view showing one example of a layout in the warehouse 201 including the rack arrangement area 202. The warehouse 201 illustrated in FIG. 2 includes the rack arrangement area 202 in which the plurality of storage racks are arranged, and the work stations 205 to which the racks arranged in the rack arrangement area 202 are conveyed. As shown in FIG. 2, for example, the rack arrangement area 202 includes a high density rack arrangement area 101a and a normal rack arrangement area 107a. Each of the areas includes a plurality of sections. Each section is an arrangement position in the rack arrangement area 202 and one rack can be arranged in each section. In the example of FIG. 2, the high density rack arrangement area 101a includes 40 sections, and the normal rack arrangement area 107a includes 12 sections.

The size of each of the sections is set such that the gap between racks arranged in adjacent sections is sufficient so as not pose the risk of racks coming into contact with each other during conveyance. In FIG. 2, each quadrilateral delineated by broken lines on the grid indicates a section, and the solid line quadrilateral shown in each section represents a rack arranged in each section. All of the sections of the normal rack arrangement area 107a have at least one side facing an aisle. In other words, in the normal rack arrangement area 107a, regardless of the section in which the rack is placed, there is no need to move racks in other sections out of the way in order to convey the rack from the section to the work station 205. On the other hand, in the high density rack arrangement area 101a, the sections located at the outermost periphery have at least one side facing an aisle, but other sections have no sides facing an aisle (in other words, such sections are completely surrounded by other adjacent sections without an aisle therebetween). Thus, in order to convey racks other than those in the outermost sections of the high density rack arrangement area 101a to the work station 205, there is a need to move at least one rack in another section.

The sections of the rack arrangement area 202 are differentiated into a plurality of groups. In the example of FIG. 2, the sections 301a, 302a, 303a, and 304 are all differentiated into groups. The numbers from 0 to 3 (also referred to below as ranks) indicated in the sections where the racks are placed in FIG. 2 indicate the groups.

For example, the sections 304 having a rank of 0 are located in the normal rack arrangement area 107a. On the other hand, the sections 301a having a rank of 1 are located in the high density rack arrangement area 101a, and racks therein can be conveyed without moving other racks to an empty section such as the section 103b. Empty sections such as the section 103b into which racks are moved out of the way, for example, are also referred to as refuge spaces. In order to move racks placed in sections 302a and 303a having a rank of 2 or 3, one or two other racks, respectively, must be moved out of the way.

In the example of FIG. 2, the normal rack arrangement area 107a is arranged close to the work stations 205, and the high density rack arrangement area 101a is far from the work stations 205. Thus, racks placed in sections with a rank of 0 are the closest to the work stations 205, and can be conveyed to the work stations 205 in the shortest time. Racks placed in sections with a rank of 1 are disposed farther from the work stations 205 than the racks placed in the sections with a rank of 0, but when conveying such racks, no other racks need to be moved out of the way, and thus, the racks can be conveyed to the work station 205 in the second shortest time after racks in areas with a rank of 0. As for racks disposed in areas with a rank of 2 or 3, the higher the rank number is, the more racks need to be moved out of the way during conveyance, and thus, the efficiency of movement of such racks is reduced.

In other words, the ranks assigned to each of the sections may be determined so as to be higher, the less work is required when conveying such racks to the work station 205 and performing a delivery operation, for example, according to the degree of efficiency of delivering articles stored in racks placed in such sections. Here, the amount of work may be defined as the length of time required in order to convey a rack to the work station 205, the number of racks that need to be moved in order to convey the rack, or a combination thereof.

FIG. 2 indicates ranks determined on the basis of a combination of the length of time required to convey a rack to the work station 205 and the number of racks that need to be moved out of the way. In this example, a rank of 0 is the highest rank, and the higher the number is, the lower the rank is. This is one example of ranking and other representative examples will be described here.

For example, if the number of racks that need to be moved out of the way is to be emphasized, then all sections in the normal rack arrangement area 107a and all sections on the outermost periphery of the high density rack arrangement area 101a may be assigned the highest rank of 0. Alternatively, if the length of time to convey racks is to be emphasized, then according to the distance from the work stations 205, ranks may be assigned such that sections of the normal rack arrangement area 107a are assigned the highest rank, a lower rank is assigned to sections closer to the work stations 205 among the outermost sections of the high density rack arrangement area 101a, and an even lower rank is assigned to sections farther from the work stations 205 among the outermost sections of the high density rack arrangement area 101a.

An example of a rack arrangement area 202 in which both the high density rack arrangement area 101a and the normal rack arrangement area 107a are present is shown in FIG. 2, but the rack arrangement area 202 may include only the high density rack arrangement area 101a.

If the ranks are set as described above, articles with a higher delivery frequency are stored in racks placed in higher rank (that is, lower rank number) sections, and articles with a lower delivery frequency are stored in racks placed in lower rank sections, thereby mitigating reduced efficiency resulting from the work required to move racks out of the way. In Embodiment 1 of the present invention, the input/output interface 206 is provided in order to determine articles to be stored in the racks placed in the plurality of ranked sections.

Figure 3:
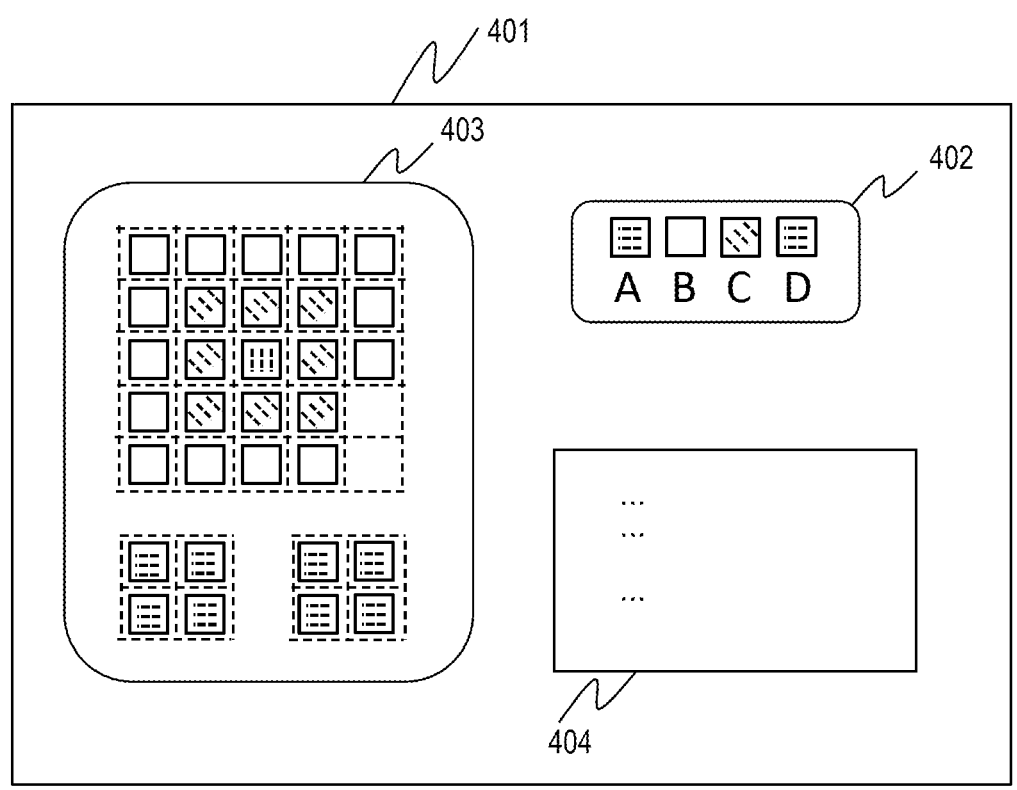
FIG. 3 is a descriptive view of an example of an input/output interface according to Embodiment 1 of the present invention.

FIG. 3 is a descriptive view of an example of the input/output interface 206 according to Embodiment 1 of the present invention.

The input/output interface 206 displays an input screen 401 shown in FIG. 3, for example. An input operation by an operator viewing the input screen 401 may be performed by the operator using a finger to directly touch command portions on the screen, for example. Alternatively, content such as numbers or characters displayed in the screen may be inputted through a keyboard or buttons. A display example for displaying rank classifications of the rack arrangement area is indicated in a ranked rack input unit 402. The classification of ranks can be made by indicating the ranks using numbers, characters, geometric shapes, or the like, for example.

In the example of FIG. 2, the rank is indicated by number. In the example of FIG. 3, the rank is indicated by letters from A to D and corresponding geometric shapes. In this example, A is the highest rank. Also, the geometric shapes corresponding to the respective ranks are displayed on the racks placed in the sections. Colors or the like (differing hues, brightnesses, color saturations, or the like corresponding to rank, for example) may be displayed instead of geometric shapes.

FIG. 3 shows an example for displaying sections of the rack arrangement area, which is sorted by rank, in a rack area output unit 403, which is sorted by rank. A storage article selection input unit 404 displays a list of articles that need to be stored in racks. The operator uses the rack input unit 402, which is sorted by rank, in order to select the rank of the areas within the rack arrangement area, which is sorted by rank, to store each of the displayed list of articles. In Embodiment 1, the differentiation operation for the rack arrangement area displayed in the rack area output unit 403 is automatically performed by the conveyance system 204.

The correspondence between the rank and the stored articles as described above can be set in any manner desired by the operator. For example, the articles and section ranks may be associated with each other such that the operator stores articles predicted to have a high shipping frequency, among the articles displayed in the storage article selection input unit 404, in racks placed in high rank sections, and stores articles predicted to have a low shipping frequency in racks in low rank sections. The prediction may be performed by the operator on the basis of past records, or on the basis of information indicating future article shipment plans, if such information is available. The storage article selection input unit 404 may display information indicating past shipping frequency records for each article and/or shipping frequency based on future shipment plans, for example.

Figure 4:
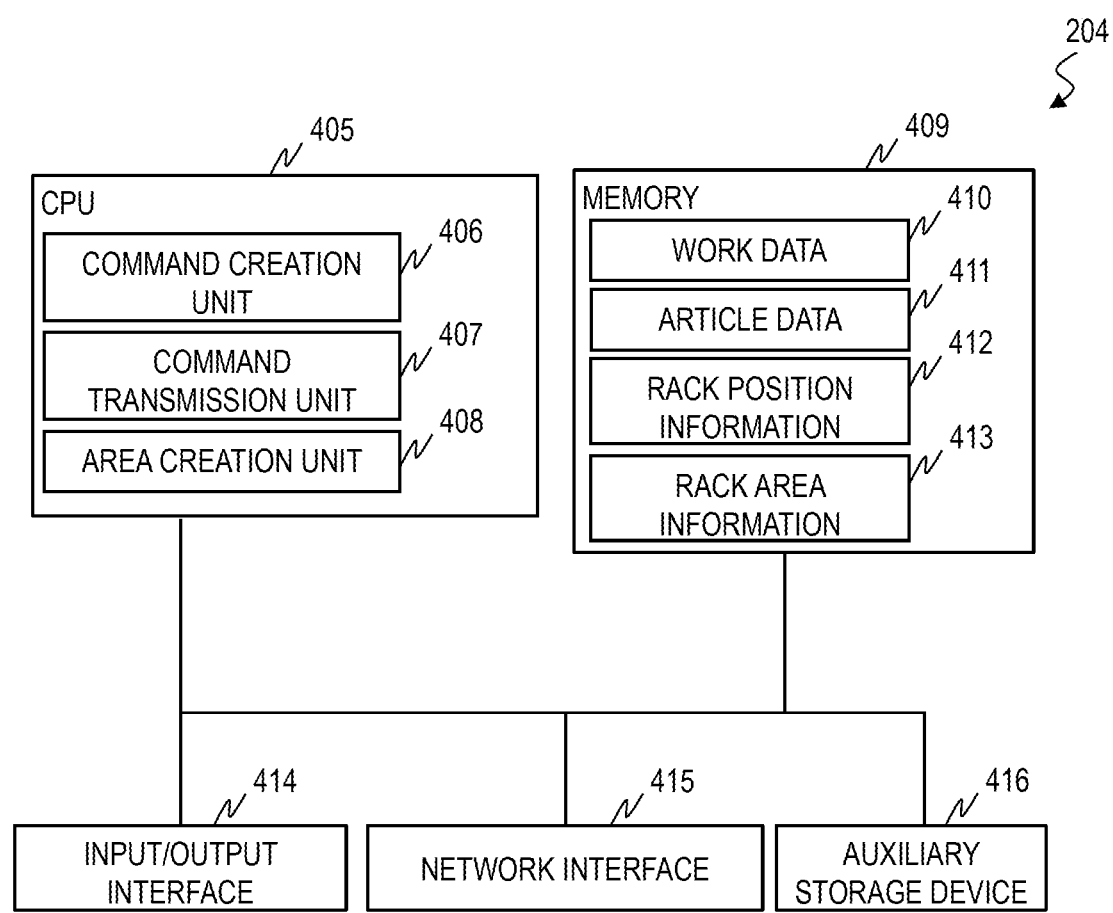
FIG. 4 is a block diagram showing an example of a hardware configuration of a conveyance system of Embodiment 1 of the present invention.

FIG. 4 is a block diagram showing an example of a hardware configuration of the conveyance system 204 of Embodiment 1 of the present invention.

The conveyance system 204 of Embodiment 1 has a CPU 405, a memory 409, an input/output interface 414, a network interface 415, and an auxiliary storage device 416, which are connected to each other.

The CPU 405 is a processor that executes various processes according to commands that are coded in programs (not shown) stored in the memory 409. The CPU 405 of the present embodiment at least executes the processes of a command creation unit 406, a command transmission unit 407, and an area creation unit 408. Details of each of the units will be described later. The processes described as being executed by each unit in the description below are in effect executed by the CPU 405.

The memory 409 is a storage device that stores programs in which processes to be executed by the CPU 405 are coded, and data and the like that is referenced by or generated in such processes. In the present embodiment, the memory 409 stores, in addition to programs, work data 410, article data 411, rack position information 412, and rack area information 413. Content thereof will be described later.

The rack area information 413 includes the arrangement in the warehouse of the high density rack arrangement area 101a and the normal rack arrangement area 107a shown in FIG. 2, the sizes thereof, the locations of the sections included therein, and the like.

The input/output interface 414 is an interface for an operator to input information and to output information to the operator. Specifically, the input/output interface 414 may include at least one input device such as a keyboard, mouse, touch sensor, or button, and a display device that outputs images, characters, and the like, or may be an integrated input/output device such as a so-called touch panel, for example.

The network interface 415 is an interface for communication through a communication network (not shown) between the conveyance vehicles 203 (see FIG. 1) and a warehouse management system 502 to be described later (see FIG. 5). Any number of types of communication networks can be used, and communication may be performed through a wired or wireless network.

The auxiliary storage device 416 is a relatively large capacity storage device such as a hard disk device or a flash memory, for example. As an example, programs to be executed by the CPU, data stored in the memory 409, and the like may be stored in the auxiliary storage device 416 with some or all of the programs and data being loaded to the memory 409 as necessary.

Figure 5:
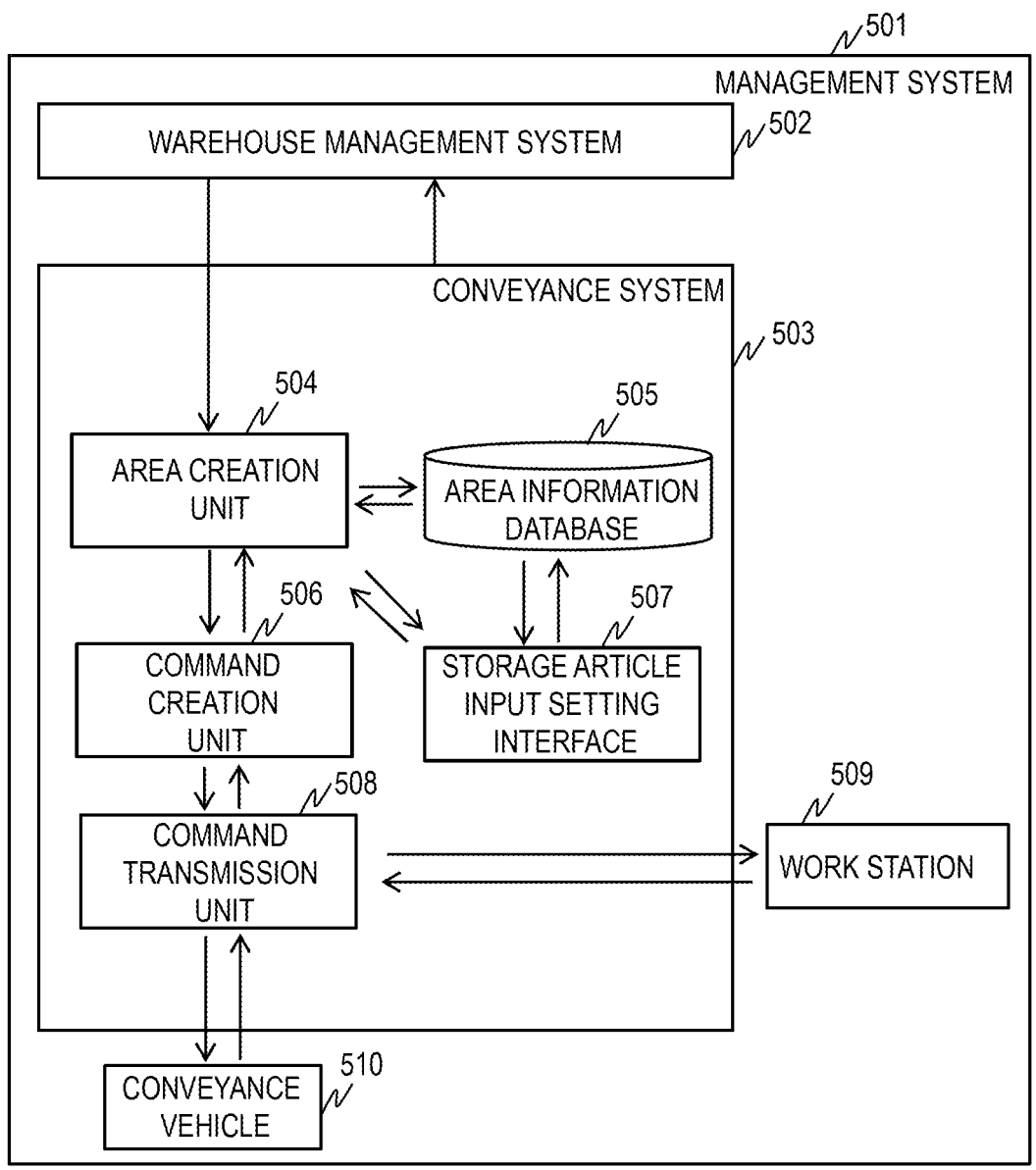
FIG. 5 is a descriptive view of an example of a functional block and process flow of a management system including the conveyance system according to Embodiment 1 of the present invention.

FIG. 5 is a descriptive view of an example of a functional block and process flow of a management system including a conveyance system according to Embodiment 1 of the present invention.

A management system 501 includes a warehouse management system 502, a conveyance system 503, a work station 509, and a conveyance vehicle 510. Among these, the conveyance system 503, the work station 509, and the conveyance vehicle 510 correspond, respectively, to the conveyance system 204, the work station 205, and the conveyance vehicle 203 of FIG. 1.

The warehouse management system 502 manages article data pertaining to articles in the warehouse and work data pertaining to work. The article data includes identification information of articles, for example. Additionally, in the case of articles already stored in any one of the storage racks, the article data may include identification information and the position of the storage rack where the article is stored. The work data includes a delivery order that records the relationship or the like between a delivery destination and identification information of the article to be delivered to the delivery destination, for example. Specifically, the work data may include identification information of the delivery destination of each article, the planned shipping date, the delivery due date, and the like. Additionally, the article data and/or the work data may include information indicating the delivery frequency records for each article and/or the delivery frequency for each article planned in the future.

The conveyance system 503 receives the article data and work data from the warehouse management system 502, and creates and manages work instructions for performing work at the work station 509. The data received here is retained as the work data 410 and article data 411 in the memory 409 shown in FIG. 4. One possible work instruction is to ship 10 of a certain article to a given delivery destination. A possible conveyance instruction for the storage rack is to convey a rack A that stores a given article, to the work station 509. One example of a movement instruction is to move the conveyance vehicle 510 to a location where the rack B is disposed.

An example of the configuration of the conveyance system 503 is one that is constituted of an area creation unit 504, an area information database 505, a command creation unit 506, a storage article input setting interface 507, and a command transmission unit 508. The area creation unit 504, the command creation unit 506, the command transmission unit 508, and the area information database 505 respectively correspond to the area creation unit 408, the command creation unit 406, the command transmission unit 407, and the rack area information 413 shown in FIG. 4. The storage article input setting interface 507 is realized by the input/output interface 414 shown in FIG. 4. The storage article input setting interface 507 may include the input screen 401 shown in FIG. 3, for example.

The area creation unit 504 receives information, transmitted from the warehouse management system 502, on articles to be stored or delivered, and records the information in the area information database 505. The storage article input setting interface 507 outputs information such as the planned delivery date and delivery due date for each article to be stored in the racks, transmitted from the area creation unit 504. The storage article input setting interface 507 may display the planned delivery date, delivery due date, and the like for each article to be stored in the rack, in the storage article selection input unit 404 of the input screen 401 shown in FIG. 3, for example.

On the basis of the information outputted by the storage article input setting interface 507, the inputter determines which section rack of the rack arrangement area to store the article, the rack arrangement area having been sorted by rank as for example shown in the rack area output unit 403 of FIG. 3, and then inputs the determination results to the storage article input setting interface 507. The area creation unit 504 determines which section rack of the rack arrangement area, which was sorted by rank, to store the article according to the inputted information, and records the determined information in the area information database 505.

The command creation unit 506 creates conveyance instructions to be transmitted to each conveyance vehicle 510 and work instructions for work to be performed in the work station 509 according to information pertaining to storage or delivery of each individual article and the storage position information for a given article in the area information database 505, which were transmitted from the warehouse management system 502.

The command transmission unit 508 transmits instructions created by the command creation unit 506 to the conveyance vehicle 510 and the work station 509. The conveyance vehicle 510 brings out the rack in the instructions according to the conveyance instructions transmitted from the command transmission unit 508, and performs the conveyance operation for storing or delivering an article. In the work station 509, a worker stores or delivers articles in a rack conveyed by the conveyance vehicle 510 according to instructions from the command transmission unit 508.

Specifically, if the article that needs to be stored in a rack is associated with a section rank, for example, the command creation unit 506 may create instructions to convey a rack in which the article is stored to the rank section associated with the article, with the command transmission unit 508 transmitting the instructions to the conveyance vehicle 510.

The storage article input setting interface 507 of the present embodiment has at least the function of receiving input from an inputter designating the rank of a section in which to place the rack that stores the article. The storage article input setting interface 507 may also have the function of receiving input designating the section in which to store the article if there are a plurality of sections with the designated rank. Also, for specific articles, the storage article input setting interface 507 may receive input designating the section to store the articles, with the area creation unit 504 determining the sections in which to store other articles.

In the example of FIG. 3, the rack area output unit 403 displays the positions of all sections and the rank assigned to each section. In other words, the rack area output unit 403 outputs information indicating the number of sections assigned ranks and the positions of the sections, and thus, the inputter can refer to this and designate the rank and position of the section in which to store each article. However, this is one example of an output method, and a configuration may be adopted in which only information indicating the number of racks assigned ranks is outputted to the rack area output unit 403. In such a case, the inputter may designate only the ranks of sections to store the articles, with the area creation unit 504 determining the sections in which to actually store the articles from among the plurality of sections with the designated ranks.

According to Embodiment 1 of the present invention, regarding articles stored by the high density-arrangement method, articles that have had a high delivery frequency in the past and articles that are anticipated to have a high delivery frequency in the future can be delivered from sections that have a high delivery efficiency ranking. On the other hand, articles that have had a low delivery frequency in the past and articles that are anticipated to have a low delivery frequency in the future can be delivered from sections that have a low ranking. As a result, it is possible to improve the storage efficiency of racks while mitigating a reduction in delivery operation efficiency of racks in the warehouse overall, and to improve the delivery operation efficiency of racks while mitigating a decrease in storage efficiency of racks.

Embodiment 2

Next, Embodiment 2 of the present invention will be described. Aside from the differences described below, the various components of the system of Embodiment 2 have the same functions as the components of Embodiment 1 that are displayed in FIGS. 1 to 5 and that are assigned the same reference characters, and thus, descriptions thereof are omitted.

The management system of Embodiment 2 of the present invention is similar to the management system 501 shown in FIG. 5 aside from not having a storage article input setting interface 507, and determination of articles to store in ranked sections being performed by the area creation unit 504. The area creation unit 504 may classify articles according to the delivery frequency thereof, and determine sections in which to the store the articles, such that articles with high delivery frequencies are stored in areas with high delivery efficiency rankings, for example. As a result, similar to Embodiment 1, it is possible to improve the storage efficiency of racks while mitigating a reduction in delivery operation efficiency of racks in the warehouse overall, and to improve the delivery operation efficiency of racks while mitigating a decrease in storage efficiency of racks.

Embodiment 3

Next, Embodiment 3 of the present invention will be described. Aside from the differences described below, the various components of the system of Embodiment 3 have the same functions as the components of Embodiment 1 that are displayed in FIGS. 1 to 5 and that are assigned the same reference characters, and thus, descriptions thereof are omitted.

Embodiment 3 of the present invention relates to a function of generating a plurality of ranked rack arrangement areas as applied to Embodiments 1 and 2. The creation of ranked rack arrangement areas is performed by the area creation unit 504 shown in FIG. 5, for example. The area creation unit 504 may assign a higher rank, the lower the number of other racks that need to be moved out of the way in order to move the original rack is, for example. Alternatively, the area creation unit 504 may assign ranks such that the racks can be moved in the shortest time possible from when the delivery operation is started. Details of such a rank determination method are as described with reference to FIG. 2.

Figure 6:
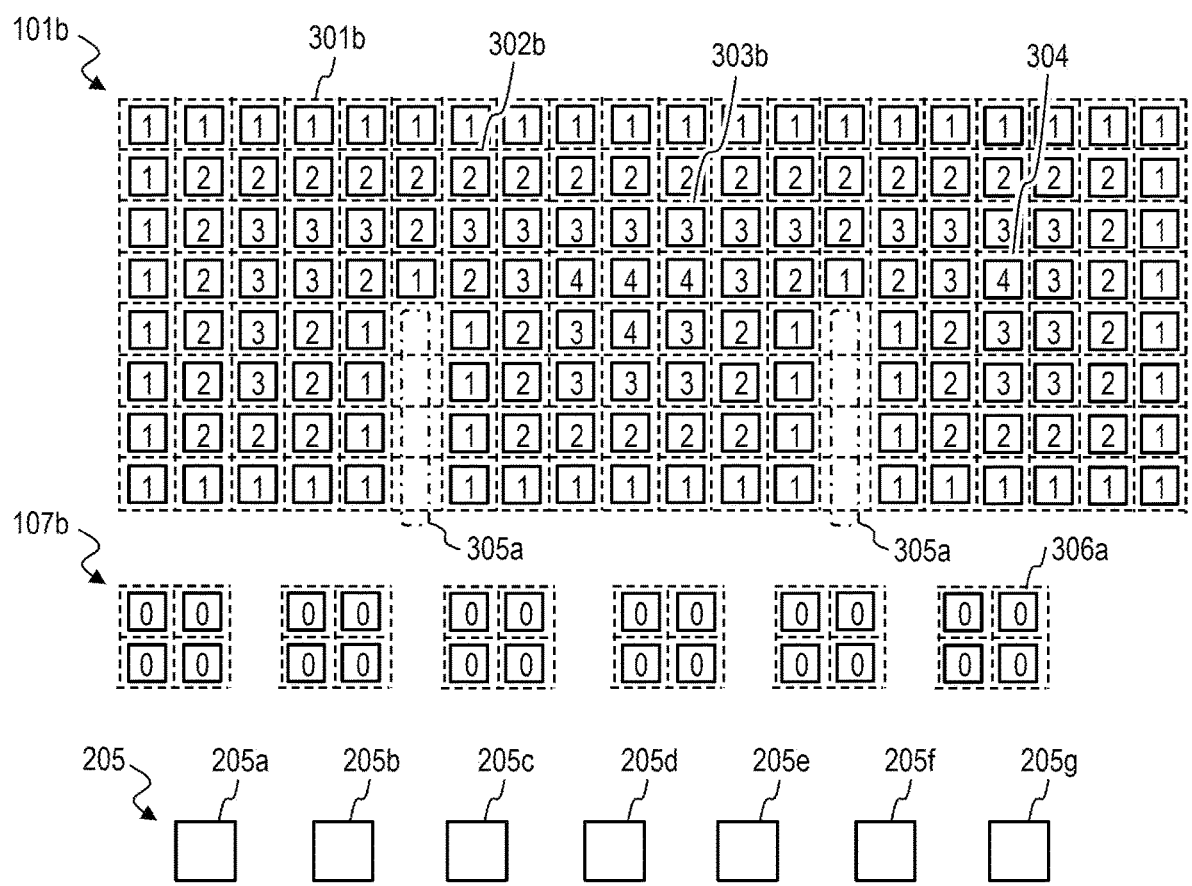
FIG. 6 is a descriptive view of first example of rack arrangement areas created by a conveyance system according to Embodiment 3 of the present invention.
Figure 7:
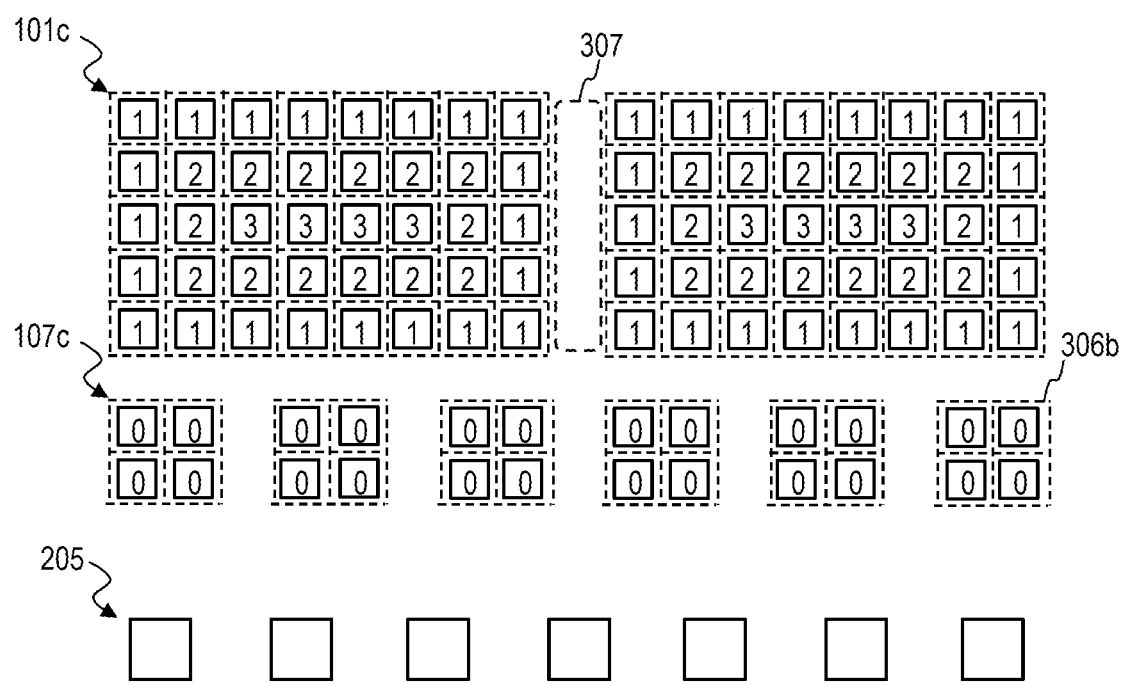
FIG. 7 is a descriptive view of second example of rack arrangement areas created by the conveyance system according to Embodiment 3 of the present invention.
Figure 8:
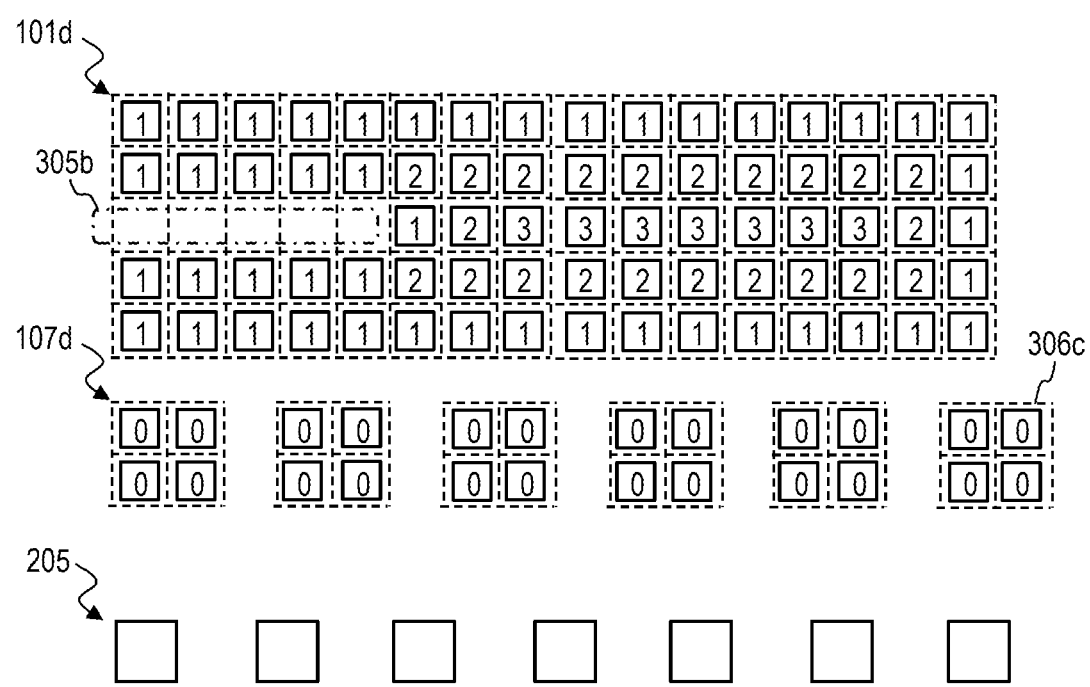
FIG. 8 is a descriptive view of third example of rack arrangement areas created by the conveyance system according to Embodiment 3 of the present invention.

FIGS. 6 to 8 are descriptive views of first to third examples of rack arrangement areas created by the conveyance system 503 according to Embodiment 3 of the present invention.

FIG. 6 shows one example of creation of ranked rack areas. Similar to the example of FIG. 2, among the plurality of sections in the high density rack arrangement area 101*b*, sections 301*b*, 302*b*, 303*b*, and 304 are ranked from 1 to 4 such that the rank is higher the fewer the number of racks that need to be moved out of the way when moving each rack is, and the rank is lower the greater the number of racks that need to be moved out of the way is. In the drawing, aisles 305*a* for a conveyance vehicle that uses the refuge spaces are formed so as to face the work station 205. In other words, the aisles 305*a* are refuge spaces (that is, open sections) constituted of a plurality of continuous sections starting from the outermost section of the high density rack arrangement area 101*b* closest to the work stations 205 and continuing in a direction towards the opposite side without passing therethrough. By such an arrangement of racks, it is possible to increase the number of rank 1 sections that can be moved without moving other racks out of the way as compared to the arrangement such as that shown in FIG. 14A in which the refuge spaces are arranged in the outermost periphery.

In the example of FIG. 7, an aisle 307 is formed from the outermost section of any one of the sides of the high density rack arrangement area 101*c* and continues to the outermost section of the opposite side, while passing therethrough. By using sections in an aisle formed so as to bisect the high density rack arrangement area 101*c* as refuge spaces, while such refuge spaces are open, the number of aisles to convey racks in sections assigned a rank of 1 to the work stations 205 is increased. Thus, the delivery efficiency is improved. In the example of FIG. 8, refuge spaces are formed from a plurality of sections starting with sections that are two sections or greater apart from both ends of a given side among outermost sections of any of the sides of the high density rack arrangement area 101d, the refuge spaces continuing in the direction of the opposite side without passing therethrough. The section that is two sections or greater apart from both ends of a given side among outermost sections of the side is a section that excludes, among the outermost peripheral sections of the side, sections on both ends of the side and sections that are adjacent to such sections. By using the refuge spaces formed in this manner as the aisle 305b for the conveyance vehicle, given the same number of refuge spaces, it is possible to increase the number of sections assigned a rank of 1 as compared to the examples of FIGS. 6 and 7.

In all of the examples of FIGS. 6 to 8, the sections of the normal rack arrangement areas 107b to 107d (sections 306a to 306c, for example) are assigned the highest rank of 0. Racks that store articles with a particularly high delivery frequency may be placed in such sections, for example.

As described in the examples above, the area creation unit 504 of FIG. 5 automatically determines the optimal arrangement on the basis of the actual layout of the warehouse and information on the articles stored in the racks. As a result, similar to Embodiments 1 and 2, it is possible to improve the storage efficiency of racks while mitigating a reduction in delivery operation efficiency of racks in the warehouse overall, and to improve the delivery operation efficiency of racks while mitigating a decrease in storage efficiency of racks.

Embodiment 4

Next, Embodiment 4 of the present invention will be described. Aside from the differences described below, the various components of the system of Embodiment 4 have the same functions as the components of Embodiments 1 to 3 that are displayed in FIGS. 1 to 8 and that are assigned the same reference characters, and thus, descriptions thereof are omitted.

Figure 9:
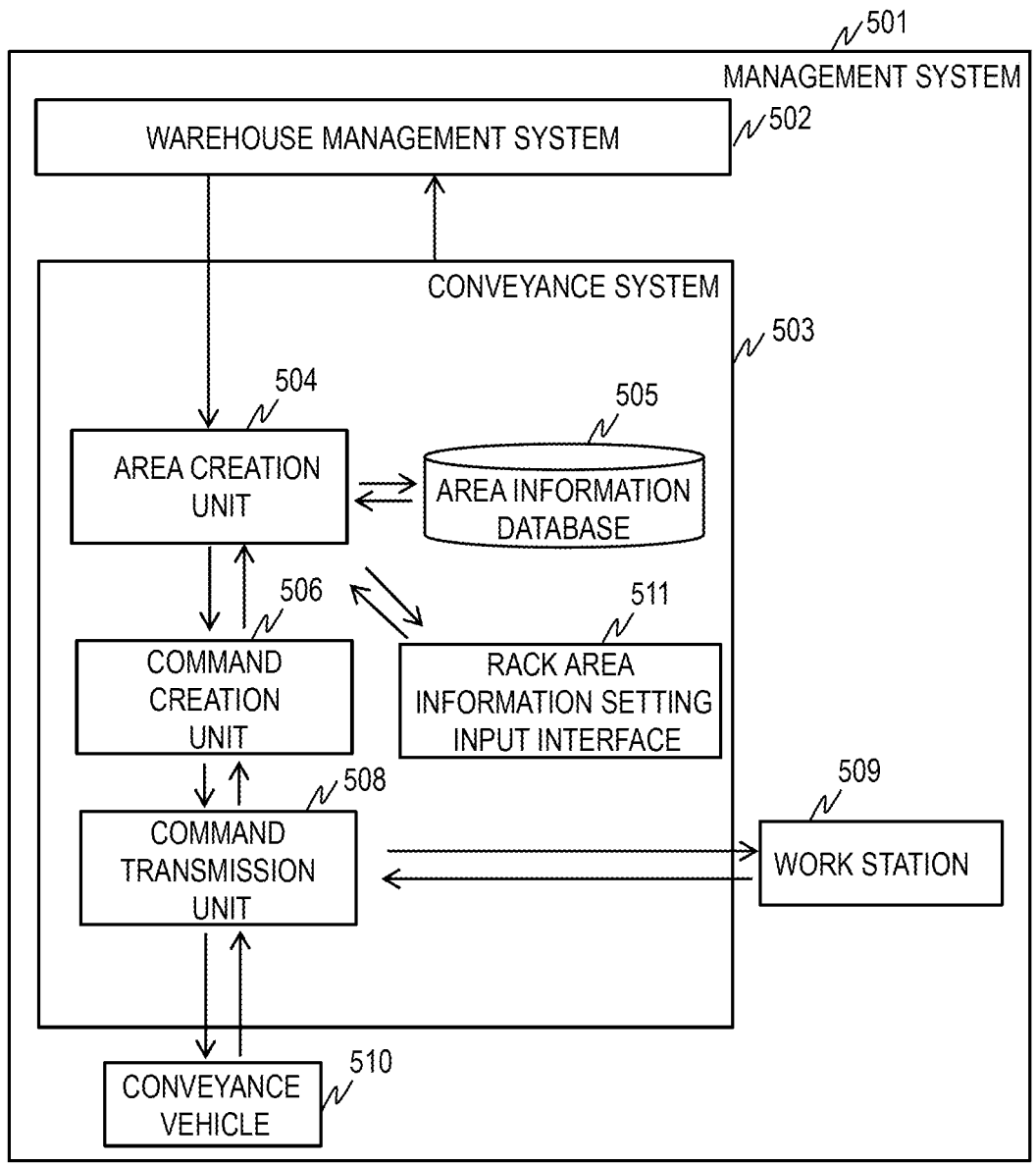
FIG. 9 is a descriptive view of an example of a functional block and process flow of a management system including a conveyance system according to Embodiment 4 of the present invention.

FIG. 9 is a descriptive view of an example of a functional block and process flow of a management system including a conveyance system according to Embodiment 4 of the present invention.

The management system 501 of Embodiment 4 is similar to the management system 501 of Embodiment 3 with the exception that the conveyance system 503 of Embodiment 4 is provided with an interface 511 that enables input of ranked rack arrangement areas. An example thereof is shown in FIG. 9. The area creation unit 504 of FIG. 9, similar to that of FIG. 5, receives information, transmitted from the warehouse management system 502, on articles to be stored or delivered. Also, the area creation unit 504 also receives information on the ranks of the sections transmitted from a rack area information setting input interface 511, and upon confirmation of articles to be stored in racks placed in sections of the respective ranks, records the information in the area information database 505.

In the system of FIG. 9, the input interface 511 may have the function of creating rack areas as described with reference to FIGS. 6 to 8 and assign ranks to each of the sections. At this time, the input interface 511 may have a selection box that displays a plurality of keywords and allows an inputter to select among them. Each keyword may indicate a principle for creating a high density rack arrangement area such as increasing the number of racks with a rank of 1 facing the work stations 205 (that is, close to the work stations 205) within the high density rack arrangement area as shown in FIG. 6, increasing the number of aisles for conveying articles from the high density rack arrangement area as shown in FIG. 7, forming an arrangement in which the number of rank 1 racks is the maximum number possible as shown in FIG. 8, or the like. When the inputter selects any one of those, the area creation unit 504 may create the area according to the example of any one of FIGS. 6 to 8 (that is, set empty sections and assign ranks).

Area creation may be performed automatically by the area creation unit 504 by the above method, for example, with the input interface 511 having an input box for the inputter to manually modify areas such as by adding or removing some of the racks.

Also, a configuration may be adopted in which creation of the high density rack arrangement area is performed by the area creation unit 504, with the inputter only determining the rank to be assigned to each section through the input interface 511. The area creation unit 504 may determine the position, size, shape, and the like of the high density rack arrangement area on the basis of the layout of the warehouse, the number of racks that need to be arranged, and the like, and may additionally determine which of the included sections should be set as refuge spaces, with the input interface 511 outputting the results thereof. Specifically, the rack arrangement area may be created according to the keyword inputted as described above. As a result, a high density rack arrangement area including refuge spaces in the arrangement of any of the examples of FIGS. 6 to 8 is created, for example.

At this time, the area creation unit 504 may calculate, for each section in the created high density rack arrangement area, the number of other racks that need to be moved out of the way in order to convey a given rack, and set the high density rack arrangement area so as to include a number of refuge spaces greater than or equal to the maximum number of racks that need to be moved out of the way. As a result, regardless of which rack is moved, there would be no shortage of refuge spaces. The inputter may determine the rank of sections other than the refuge spaces with reference to the outputted results, and input the determination results to the input interface 511.

Alternatively, the opposite configuration to what was described above may be adopted in which the inputter creates the high density rack arrangement area through the input interface 511, with the area creation unit 504 assigning ranks to the sections in the created high density rack arrangement area. At this time, as already described, the area creation unit 504 may determine ranks according to the efficiency of delivery of articles stored in the racks placed in the respective sections.

Additionally, the input interface 511 may have the function of allowing the inputter to determine the articles to be stored in the rack arrangement area in which ranking was performed, and receiving the results thereof by input, in a manner similar to the storage article input setting interface 507 of FIG. 5.

In the above example, the area creation unit 504 creates the high density rack arrangement area according to keywords indicating the creation principle for the high density rack arrangement area, but the area creation unit 504 may create a plurality of proposed high density rack arrangement area according to a plurality of creation principles for the high density rack arrangement area, and allow the inputter to select thereamong. At this time, the area creation unit 504 may calculate an index indicating the efficiency of a delivery operation for the entire high density rack arrangement area for each proposed high density rack arrangement area, and an index indicating the storage efficiency of the racks, and output such indices.

The index indicating the efficiency of the delivery operation for the entire high density rack arrangement area may be the total time required for delivering all articles stored in the high density rack arrangement area, the average time required to perform one delivery operation, or the like, for example. The index indicating the storage efficiency of the racks may be the number of racks stored per unit area of floor space in the warehouse, or the like, for example.

Also, the area creation unit 504 may output the proposal with the highest delivery efficiency among proposals in which the storage efficiency of the racks satisfies a predetermined condition (such as being greater than or equal to a predetermined value), or output the proposal with the highest storage efficiency of the racks among proposals in which the delivery efficiency satisfies a predetermined condition (such as being greater than or equal to a predetermined value).

According to Embodiment 4 above, similar to Embodiments 1 to 3, it is possible to improve the storage efficiency of racks while mitigating a reduction in delivery operation efficiency of racks in the warehouse overall, and to improve the delivery operation efficiency of racks while mitigating a decrease in storage efficiency of racks. Additionally, by providing the above-mentioned input interface, it is possible to form a rack arrangement area with greater flexibility according to the actual layout of the warehouse.

Embodiment 5

Next, Embodiment 5 of the present invention will be described. Aside from the differences described below, the various components of the system of Embodiment 5 have the same functions as the components of Embodiments 1 to 4 that are displayed in FIGS. 1 to 9 and that are assigned the same reference characters, and thus, descriptions thereof are omitted.

Figure 10:
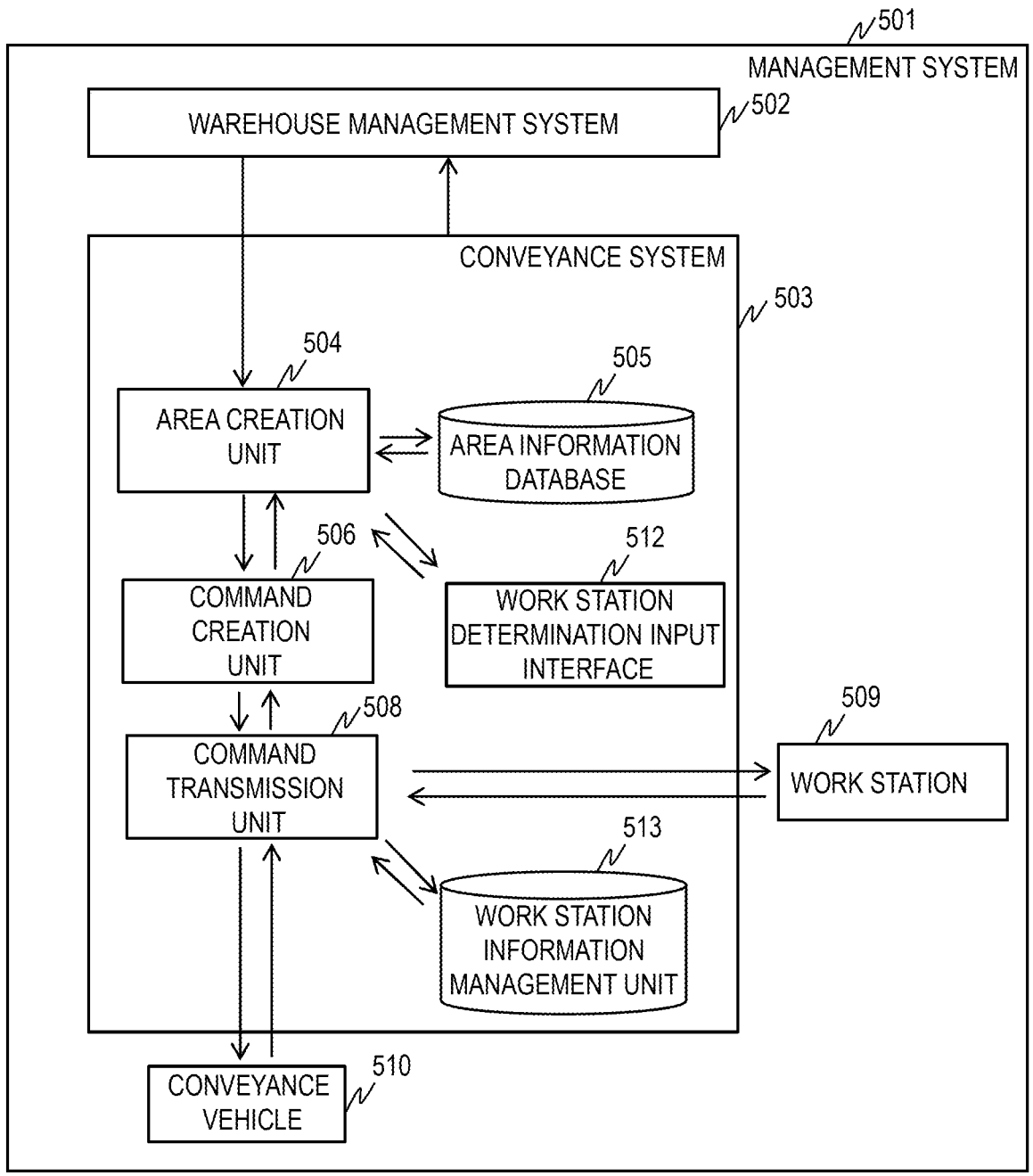
FIG. 10 is a descriptive view of an example of a functional block and process flow of a management system including a conveyance system according to Embodiment 5 of the present invention.

FIG. 10 is a descriptive view of an example of a functional block and process flow of a management system including a conveyance system according to Embodiment 5 of the present invention.

The management system 501 of Embodiment 5 is similar to the management system 501 (FIG. 5, for example) of Embodiments 1 to 4 with the exception that the conveyance system 503 in Embodiment 5 is provided with a work station determination input interface 512 and a work station information management unit 513. The work station determination input interface 512 is used in order to determine, for each rack arrangement area in which a plurality of ranks are assigned, the work station 205 at which to deliver or stock articles stored at a rack belonging to the rack arrangement area.

The work station information management unit 513 at least includes information identifying the work station 205 at which to perform work on articles belonging to the racks placed in sections having the respective ranks, and stores such information in the memory 409 (see FIG. 4). When the inputter inputs, to the work station determination input interface 512, information associating the rank of the section with any of the plurality of work stations 205, for example, the information is stored in the work station information management unit 513.

The area creation unit 504 of FIG. 10, similar to the area creation unit 504 of FIG. 5, receives information, transmitted from the warehouse management system 502, on articles to be stored or delivered. Also, the area creation unit 504 receives information, transmitted from the work station determination input interface 512, of the work station 205 at which articles are delivered or stocked for each of the rack areas in which a plurality of ranks are assigned, and transmits the information to the command creation unit 506.

The work station determination input interface 512 may have the function of allocating the work stations 205 (see FIG. 6, for example) at which to deliver or stock articles, for all sections in the rack arrangement area in which a plurality of ranks have been assigned. Also, the work station determination input interface 512 may have the function of allocating the work stations 205 for specific rack arrangement areas. Additionally, the work station determination input interface 512 may have an input interface that allocates one work station 205 (among the work stations 205a to 205g shown in FIG. 6, for example) per area (area assigned rank of 0 to 4) among the rack arrangement areas given a numerical rank of 0 to 4 in FIG. 6, for example, or that allocates a plurality of work stations 205 per area. Alternatively, the work station determination input interface 512 may have an input interface that allocates one work station 205 for a plurality of areas such as two or three areas among the rack areas that are assigned ranks.

When performing a stocking operation for an article stored in a section assigned any one of the ranks, the command creation unit 506 may, for example, create a command to convey the rack in which the article is to be stored (rack placed in section assigned any of the above-mentioned ranks) to the work station 205 corresponding to this rank. Similarly, when performing a delivery operation for an article stored in a rack placed in a section assigned any one of the ranks, the command creation unit 506 may create a command to convey the rack to the work station 205 corresponding to this rank. The created command is transmitted by the command transmission unit 508 to the conveyance vehicle 510 through the network interface 415 (FIG. 4).

Also, the work station determination input interface 512 of the present embodiment may additionally have the function of at least either of the rack area information setting input interface 511 shown in FIG. 9 or the storage article input setting interface 507 shown in FIG. 5.

According to Embodiment 5 described above, it is possible to prioritize stocking or delivery of a group of articles stored in a given high density rack arrangement area, for example. Alternatively, it is possible to allocate the work stations 205 to which the conveyance vehicle 510 can move racks in the shortest time for each area assigned a rank, which improves the efficiency of stocking and delivery.

Embodiment 6

Next, Embodiment 6 of the present invention will be described. Aside from the differences described below, the various components of the system of Embodiment 6 have the same functions as the components of Embodiments 1 to 5 that are displayed in FIGS. 1 to 10 and that are assigned the same reference characters, and thus, descriptions thereof are omitted.

The management system 501 of Embodiment 6 is similar to the management system 501 (FIG. 9) of Embodiment 4 with the exception that the management system 501 of Embodiment 6 has the function of automatically determining the work station 205 at which to handle articles for delivery or stocking for each rack arrangement area in which a plurality of ranks are assigned. The area creation unit 504 may have this function, for example. The conveyance system 503 of Embodiment 6, similar to the conveyance system 503 of Embodiment 5, has the work station information management unit 513 (see FIG. 10) in order to store information of the work station 205 (see FIG. 6, for example) determined by the area creation unit 504.

The work station 205 corresponding to the area of each rank may be determined such that the conveyance time or movement distance per instance of conveyance of racks by the conveyance vehicle 510 to the work station 205 is at a minimum when averaged over all delivery operations performed over a predetermined period (one day, for example), on the basis of information indicating the delivery frequency of each article, information of the section of the rack in which each article is stored, and information on the rank of the section, which are stored in the memory 409 (FIG. 4), for example. Also, the work station 205 may be determined such that all stocking and delivery operations are completed in a short period of time, according to fluctuations in delivery frequency of articles stored in each rack arrangement area assigned a rank. As a result, similar to Embodiments 1 to 5, it is possible to improve the storage efficiency of racks and the delivery operation efficiency of racks throughout the entire warehouse.

Embodiment 7

Next, Embodiment 7 of the present invention will be described. Aside from the differences described below, the various components of the system of Embodiment 7 have the same functions as the components of Embodiments 1 to 6 that are displayed in FIGS. 1 to 10 and that are assigned the same reference characters, and thus, descriptions thereof are omitted.

The management system 501 of Embodiment 7 is similar to the management system 501 of Embodiments 1 to 6 with the exception that the management system 501 of Embodiment 7 has the function of interchanging a rack in a rack arrangement area in which a plurality of ranks are assigned, with a rack in a area with a different rank. In FIG. 6, for example, when moving racks placed in sections 301b, 302b, 303b, and 304, which are each assigned a rank from 1 to 4, in some cases, the rack changes positions from its original position as a result of the rack being moved out of the way of other racks, as shown in an example of a delivery operation for the rack of FIG. 1. As a result, as the delivery operation progresses, the original area configuration can change, such as racks that store low delivery frequency articles being placed in high rank sections, for example. Also, the delivery frequency of an article stored in a rack can fluctuate depending on the period, for example. In such a case, an operation to interchange racks between sections with differing ranks can be performed such that each of the racks is placed in a section with a rank corresponding to the delivery frequency of articles stored therein. Embodiment 7 has a function of interchanging racks among rack arrangement areas assigned a plurality of ranks, in such a situation.

Figure 11:
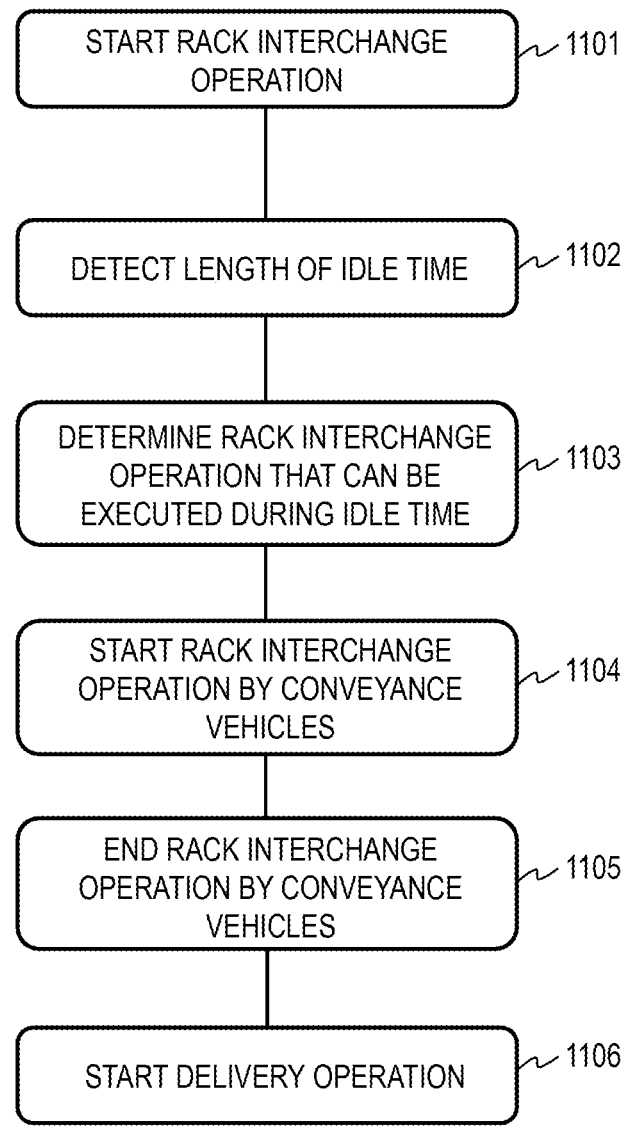
FIG. 11 is a flowchart showing an example of a rack interchange operation executed by a management system according to Embodiment 7 of the present invention.

FIG. 11 is a flowchart showing an example of a rack interchange operation executed by the management system 501 according to Embodiment 7 of the present invention.

When the rack interchange operation starts (step 1101), for example, the conveyance system 503 first detects the length of idle time during which the rack interchange operation can be performed such as a break time or night (step 1102). Next, the conveyance system 503 detects the time required to perform the rack interchange operation, and then determines the rack interchange operations that can be executed within the idle time (step 1103). When the conveyance system 503 transmits to the conveyance vehicle 510 a command to perform the determined interchange operation, the conveyance vehicle 510 starts the interchange operation (step 1104). After the interchange operation by the conveyance vehicle 510 is completed (step 1105), the idle time ends and delivery operations are started (step 1106).

Figure 12:
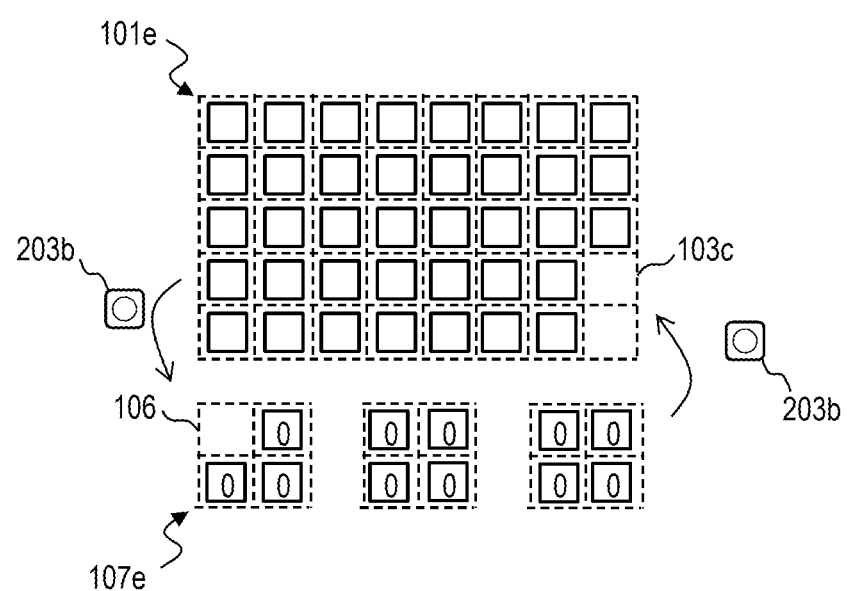
FIG. 12 is a descriptive view showing an example of a rack interchange operation executed by the management system according to Embodiment 7 of the present invention.
Figure 13:
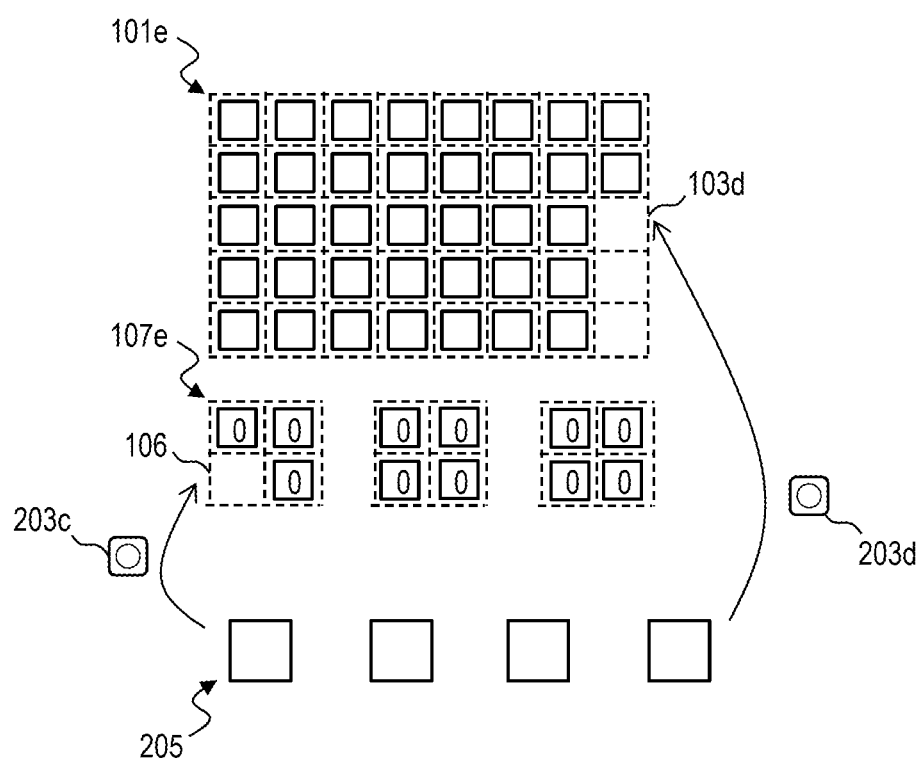
FIG. 13 is a descriptive view showing an example of a rack interchange operation executed by the management system according to Embodiment 7 of the present invention.

FIGS. 12 and 13 are descriptive views showing examples of a rack interchange operation executed by the management system 501 according to Embodiment 7 of the present invention.

FIG. 12 shows an example in which racks placed in the high density rack arrangement area 101e and racks placed in the normal rack arrangement area 107e are interchanged by the conveyance vehicle 203b during the idle time. The conveyance vehicle 203b may convey racks that store high delivery frequency articles among racks placed in the normal rack arrangement area 107e to empty sections 103c of the high density rack arrangement area, and convey racks that store low delivery frequency articles among racks placed in the high density rack arrangement area 101e to the empty section 106 of the normal rack arrangement area 107e, for example.

By the same token, the conveyance system 503 may create a command to perform an interchange operation on racks placed in two or more sections with differing ranks in the high density rack arrangement area 101e and transmit the command to the conveyance vehicle 203b FIG. 13 shows an example of a case where there is no idle time, in which after the delivery operation at the work stations 205 is completed, racks that store products to be delivered thereafter (within the same day, for example) are returned by the conveyance vehicle 203c to sections within the normal rack arrangement area 107e, and racks that are not storing products to be delivered are returned by the conveyance vehicle 203d to sections in the high density rack arrangement area 101e.

This rack interchange operation may be determined by the area creation unit 504 shown in FIGS. 5, 9, and 10, for example, or may be inputted by an inputter to the rack area information setting input interface 511 shown in FIG. 9. The command creation unit 506 creates a command to execute the interchange operation that was determined by the area creation unit 504 or inputted to the rack area information setting input interface 511, and the command transmission unit 508 transmits the command to the conveyance vehicle 510 (that is, the conveyance vehicle 203).

According to Embodiment 7, even if the rack is moved from its initial position that matches its rank as a result of the rack being moved out of the way of another rack being delivered from the high density rack arrangement area 101e, it is possible to return the rack to its original position. Also, it is possible to interchange racks in the rack arrangement area in which ranks were assigned according to changes such as in the delivery frequency of the stored article.

Embodiment 8

Next, Embodiment 8 of the present invention will be described. Aside from the differences described below, the various components of the system of Embodiment 8 have the same functions as the components of Embodiments 1 to 7 that are displayed in FIGS. 1 to 13 and that are assigned the same reference characters, and thus, descriptions thereof are omitted.

Similar to the management system 501 of Embodiment 7, the management system 501 of Embodiment 8 has the function of interchanging a rack in a section that is assigned a rank with a rack in a section with a different rank. If stocking and delivery of articles are repeatedly performed in a warehouse, then articles of the same type that were stocked at different times (that is, articles that are the same product) can be stored. The management system 501 of Embodiment 8 has the function of regularly or irregularly interchanging racks such that articles that were stocked on the same date (or similar dates) are stored in racks in sections with the same rank in the rack arrangement area in which a plurality of ranks are assigned, and racks that store articles that were stocked a longer time ago are disposed in low rank sections.

This rack interchange operation may be determined by the area creation unit 504 shown in FIGS. 5, 9, and 10, for example, or may be inputted by an inputter to the rack area information setting input interface 511 shown in FIG. 9. In the case of the former, the article data 411 (FIG. 4) may include information on the stocking dates of the articles and racks in which the articles are stored. The area creation unit 504 may refer to the article data 411, the rack position information 412, and the rack area information 413 (FIG. 4) and if articles of the same type are stored in a plurality of racks, then the area creation unit 504 may decide that sections in which the racks are placed should be interchanged such that racks that store articles that were stocked during the same or similar time are disposed in sections of the same rank. More specifically, for example, the area creation unit 504 may determine that the racks should be interchanged such that, among two racks that store the same type of article, if the rack that stores the article with a later stocking time is placed in a higher rank section, then the rack that stores the article with an earlier stocking time is placed in a higher rank section.

According to Embodiment 8, it is possible to prevent the problem that articles that were stocked a long time ago remain on the rack for a long period of time with the product quality thereof deteriorating.

The present invention is not limited to the embodiments above, and includes various modification examples. The embodiments above were described in detail in order to explain the present invention in an easy to understand manner, but the present invention is not necessarily limited to including all configurations described, for example. It is possible to replace a portion of the configuration of one embodiment with a configuration of another embodiment, and it is possible to add to the configuration of the one embodiment a configuration of another embodiment. Furthermore, other configurations can be added or removed, or replace portions of the configurations of the respective embodiments.

Some or all of the respective configurations, functions, processing units, processing means, and the like can be realized with hardware such as by designing an integrated circuit, for example. Additionally, the respective configurations, functions, and the like can be realized by software, by the processor interpreting programs that realize the respective functions and executing such programs. Programs, data, tables, files, and the like realizing respective functions can be stored in a storage device such as a non-volatile semiconductor memory, a hard disk drive, or a solid state drive (SSD), or in a computer-readable non-transitory data storage medium such as an IC card, an SD card, or a DVD.

Control lines and data lines regarded as necessary for explanation have been indicated, but not all control lines and data lines in the product have necessarily been indicated. In reality, almost all components can be thought of as connected to each other.

What is claimed is:

1. A rack management system, comprising:
a processor; and
a storage unit coupled to the processor,
wherein the storage unit stores information indicating positions of at least two areas each including a plurality of sections included in a location in which storage racks that store articles can be arranged,
wherein one of said storage racks can be arranged in each of the plurality of sections,
wherein at least one of the plurality of sections is surrounded by other adjacent said sections without an aisle to convey the storage racks therebetween, and
wherein the processor:
classifies the plurality of sections in a first area of the at least two areas into a plurality of sections assigned ranks indicating a degree of efficiency of an operation to convey the storage racks placed therein to a predetermined working area and one or more empty sections, the predetermined working area being one of the at least two areas,
classifies, in the working area of the at least two areas, the one or more empty sections,
classifies the storage racks into a plurality of ranks, the plurality of ranks corresponds to the assigned ranks of the plurality of sections in the first area,
determines an optimal layout of the first area based on the plurality of ranks,
determines an amount of time required to move one or more other storage racks to the optimal layout,
on a condition that the amount of time required is less than an idle time, move the one or more other storage racks to at least one of the first area, the one or more empty areas, and the working area based on the optimal layout, and
on a condition that the amount of the time required is greater than the idle time, move a portion of the one or more racks that are being delivered within a predetermined amount of time from the working area to the one or more empty areas and move a remaining portion of the one or more racks that are not being delivered within the predetermined amount of time to the first area, and
outputs results of the classifications and the optimal layout.

2. The rack management system according to claim 1, wherein the processor evaluates the efficiency of conveying the storage rack to the working area on the basis of at least one of a numerical count of other storage racks that need to be moved in order to convey the storage rack and a length of time needed to convey the storage rack to be conveyed to the working area.

3. The rack management system according to claim 1, further comprising:
an input/output unit coupled to the processor,
wherein the storage unit stores information pertaining to the articles stored in each of the storage racks, and
wherein the processor
outputs, through the input/output unit, information indicating a numerical count of the sections assigned each of the assigned ranks, and information pertaining to the articles stored in each of the storage racks, and,
when information associating the articles with the assigned ranks is inputted through the input/output unit, generates the inputted information associating the articles with the assigned ranks and stores the information in the storage unit.

4. The rack management system according to claim 1,
wherein the storage unit stores information indicating a delivery frequency of the articles stored in each of the storage racks, and
wherein the processor generates information associating articles with a high said delivery frequency with said plurality of ranks indicating a higher efficiency, and stores the information in the storage unit.

5. The rack management system according to claim 4, further comprising:
a network interface unit coupled to the processor,
wherein the processor transmits, to a conveyance vehicle that conveys the storage racks, a command to convey the storage racks in which the articles are stored to the section with the assigned rank associated with the article, through the network interface unit.

6. The rack management system according to claim 1, further comprising:
an input/output unit coupled to the processor,
wherein, when the processor receives input through the input/output unit of information instructing an increase in aisles in the first area to convey the storage racks, the processor classifies the plurality of sections in the first area into a plurality of sections in which the storage racks are to be placed and the one or more empty sections, such that a plurality of continuous sections starting from an outermost peripheral section on a side of an area where the storage racks can be arranged, to an outermost peripheral section on a side opposite to said side while passing therethrough, are designated as the empty sections.

7. The rack management system according to claim 1, further comprising:
an input/output unit coupled to the processor,
wherein, when the processor receives input through the input/output unit of information instructing an increase to a maximum of a numerical count of storage racks that can be conveyed without moving other storage racks in the first area, the processor classifies the plurality of sections into a plurality of sections in the first area in which the storage racks are to be placed and the one or more empty sections, such that, among sections in any one of outermost peripheral sides of the area in which the storage racks can be arranged, a row of sections that continues from a section that is at least two sections apart from either end of the side, in a direction towards a side opposite to said side while not passing through the side opposite to said side, are designated as the empty sections.

8. The rack management system according to claim 1, further comprising:
an input/output unit coupled to the processor,
wherein the storage unit stores information indicating a positional relationship between the first area in which the storage racks can be arranged, and the work area that is a conveyance destination of the storage racks, and
wherein, when the processor receives input through the input/output unit of information instructing an increase in a numerical count of storage racks that are close to the work area and that can be conveyed without moving other storage racks, the processor classifies the plurality of sections into a plurality of sections in which the storage racks are to be placed and the one or more empty sections, such that at least a row of sections that continues from an outermost section of a side closest to the work area of the area where the storage racks can be arranged, in a direction towards a side opposite to said side while not passing through the side opposite to said side, are designated as the empty sections.

9. The rack management system according to claim 1, further comprising:
a network interface unit coupled to the processor,
wherein the storage unit stores
information indicating the storage racks placed in the sections,
information indicating a delivery frequency of the articles stored in each of the storage racks, and
information associating each of a plurality of said work areas with each of the assigned ranks,
wherein the processor
associates each of the plurality of work areas with each of the assigned ranks such that, on the basis of the delivery frequency, a minimum movement distance or conveyance time is taken per instance of conveyance of the storage racks in the first area to the work areas during the idle time, for when a conveyance vehicle that conveys the storage racks conveys each of the storage racks placed in sections with the assigned ranks to the work area corresponding to each of the assigned ranks, and,
if an operation is performed on the storage rack to be placed in a section of a given rank or the storage rack already placed in a section of a given rank, transmits to the conveyance vehicle a command to convey the storage rack to the work area corresponding to the assigned rank of the section.

10. The rack management system according to claim 1, further comprising:
a network interface unit coupled to the processor,
wherein the storage unit stores
information indicating the storage racks placed in the sections,
information indicating a delivery frequency of the articles stored in each of the storage racks, and
schedule information of stocking and delivery operations on the plurality of storage racks,
wherein the processor
calculates a length of idle time that can be used in an interchange operation for the storage racks disposed in at least two of the sections on the basis of the schedule information,
if the storage racks storing lower delivery frequency articles are placed in the sections with a relatively high assigned rank, identifies operations that would be completed within the idle time among the operations to interchange the storage racks placed in the at least two sections such that the storage racks that store relatively high delivery frequency articles are placed in the sections with a relatively high assigned rank, and
transmits, to a conveyance vehicle that conveys the storage racks, a command to execute the identified operation, through the network interface unit.

11. The rack management system according to claim 10,
wherein the storage unit stores information indicating a stocking time of the articles stored in each of the storage racks, and
wherein, if the storage racks storing articles with a later stocking time are placed in the sections with a higher assigned rank, the processor identifies operations to interchange the storage racks placed in the at least two sections such that the storage racks that store articles with an earlier stocking time are placed in the sections with a relatively high assigned rank.

12. The rack management system according to claim 1, wherein the processor classifies the plurality of sections into a plurality of sections with the assigned ranks and the one or more empty sections, such that a numerical count of the empty sections is greater than or equal to a maximum numerical count of storage racks that need to be moved in order to convey the storage rack in the given section.

13. A rack management method that is executed by a rack management system having a processor and a storage unit coupled to the processor,
- wherein the storage unit stores information indicating positions of at least two areas each including a plurality of sections included in a location in which storage racks that store articles can be arranged,
- wherein one of said storage racks can be arranged in each of the plurality of sections,
- wherein at least one of the plurality of sections is surrounded by other adjacent said sections without an aisle to convey the storage racks therebetween, and
- wherein the rack management method comprises:
  - classifying, via the processor, the plurality of sections in a first area of the at least two areas into a plurality of sections assigned ranks indicating a degree of efficiency of an operation to convey the storage racks placed therein to a predetermined working area and one or more empty sections into which, if there is a need to move one or more other storage racks in order to convey a storage rack placed in a given sections, the predetermined working area being one of the at least two areas;
  - classifying, in the working area of the at least two areas, one or more empty sections;
  - classifying the storage racks into a plurality of ranks corresponding to the assigned ranks of the plurality of sections in the first area;
  - determining an optimal layout of the first area based on the plurality of ranks;
  - determining an amount of time required to move one or more other storage racks to the optimal layout;
    - on a condition that the amount of time required is less than an idle time, move the one or more other storage racks to at least one of the first area, the one or more empty areas, and the working area based on the optimal layout, and
    - on a condition that the amount of the time required is greater than the idle time, move a portion of the one or more racks that are being delivered within a predetermined amount of time from the working area to the one or more empty areas and move a remaining portion of the one or more racks that are not being delivered within the predetermined amount of time to the first area; and
  - outputting, via the processor, results of the classifications and the optimal layout.

* * * * *